United States Patent
Cho et al.

(10) Patent No.: US 10,605,362 B2
(45) Date of Patent: Mar. 31, 2020

(54) CONTROL METHOD FOR VEHICLE WITH DCR

(71) Applicants: Hyundai Motor Company, Seoul (KR); Kia Motors Corp., Seoul (KR)

(72) Inventors: Sung Hyun Cho, Yongin-si (KR); Seong Hwan Cheong, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 16/054,837

(22) Filed: Aug. 3, 2018

(65) Prior Publication Data

US 2019/0257420 A1 Aug. 22, 2019

(30) Foreign Application Priority Data

Feb. 21, 2018 (KR) ........................ 10-2018-0020784

(51) Int. Cl.
| | |
|---|---|
| *B60W 10/113* | (2012.01) |
| *F16H 61/688* | (2006.01) |
| *F16H 61/12* | (2010.01) |
| *B60W 10/02* | (2006.01) |

(Continued)

(52) U.S. Cl.
CPC .......... *F16H 61/688* (2013.01); *B60W 10/02* (2013.01); *B60W 10/06* (2013.01); *B60W 10/113* (2013.01); *B60W 20/00* (2013.01); *F16H 61/12* (2013.01); *F16D 2500/5108* (2013.01); *F16H 2061/1284* (2013.01)

(58) Field of Classification Search
None
See application file for complete search history.

(56) References Cited

U.S. PATENT DOCUMENTS 5,492,194 A * 2/1996 McGinn ............... B60K 17/344
180/233
8,412,425 B2 4/2013 Katrak et al.
(Continued)

FOREIGN PATENT DOCUMENTS

| JP | 2009-097648 A | 5/2009 |
|---|---|---|
| JP | 2009-127828 A | 6/2009 |

(Continued)

*Primary Examiner* — Justin Holmes
(74) *Attorney, Agent, or Firm* — Morgan, Lewis & Bockius LLP

(57) ABSTRACT

A control method for a vehicle with a Dual Clutch Transmission (DCT) may include: determining whether it is a wheel speed-unknown state by a TCU, determining whether an input shaft speed sensor is in a normal state when it is the wheel speed-unknown state, determining whether IG-OFF occurs when it is the wheel speed-unknown state and the input shaft speed sensor IS for is in a normal state, storing information related to the current wheel speed-unknown state and an output shaft speed of the DCT determined by the input shaft speed sensor, determining whether the TCU is not in TCU latch-off and whether it was the wheel speed-unknown state immediately before IG-OFF on the basis of the stored data, when IG-ON occurs, and performing pre-engaging on the basis of the DCT output shaft speed stored immediately after IG-OFF, when the TCU is not in latch-off and it was the wheel speed-unknown state immediately before IG-OFF.

7 Claims, 2 Drawing Sheets

(51) Int. Cl.
*B60W 20/00* (2016.01)
*B60W 10/06* (2006.01)

(56) References Cited

U.S. PATENT DOCUMENTS

| | | | |
|---|---|---|---|
| 2008/0096721 A1* | 4/2008 | Honma | F16H 61/0437 477/120 |
| 2009/0145673 A1* | 6/2009 | Soliman | B60W 20/13 180/65.1 |
| 2016/0138709 A1 | 5/2016 | Yoon et al. | |

FOREIGN PATENT DOCUMENTS

| | | |
|---|---|---|
| JP | 2013-079702 A | 5/2013 |
| JP | 2013-083330 A | 5/2013 |
| KR | 10-2012-0077737 A | 7/2012 |
| KR | 10-2015-0044351 A | 4/2015 |
| KR | 10-2017-0019764 A | 2/2017 |

* cited by examiner

CONTROL METHOD FOR VEHICLE WITH DCR

CROSS REFERENCE TO RELATED APPLICATION

The present application claims priority of Korean Patent Application No. 10-2018-0020784 filed on Feb. 21, 2018, the entire contents of which is incorporated herein for all purposes by this reference.

BACKGROUND OF THE INVENTION

Field of the invention

The present invention relates to a control method for a vehicle with a DCT and, more particularly, to a method of controlling a vehicle with a DCT when a wheel speed sensor fails.

Description of Related Art

A Dual Clutch Transmission (DCT) is configured to appropriately adjust and output power from two input shaft to one output shaft through two clutches and there is a DCT which is provided with only two input shaft speed sensors for measuring the speeds of two input shaft without an output shaft speed sensor.

In a vehicle provided with a DCT without an output shaft speed sensor, a signal is received from a wheel speed sensor on a wheel of the vehicle during shifting and the output shaft speed of the DCT is determined on the basis of the signal to be used for shifting.

The signal from a wheel speed sensor is transmitted through a communication system such as a Controller Area Network (CAN), so when the wheel speed sensor fails or the CAN fails, a Transmission Control Unit (TCU) controlling the DCT has to appropriately cope with the failure.

As described above, a TCU controlling a DCT cannot normally receive a signal from a wheel speed sensor due to failure of the wheel speed sensor or a CAN (which is called a "wheel speed-unknown state" hereafter). In the instant case, if a vehicle is driven at a high speed and IG-OFF and IG-ON sequentially occur due to the intention of a driver, the TCU controlling the DCT cannot recognize that it was the wheel speed-unknown state before IG-OFF immediately after IG-ON, so that the TCU pre-engages the DCT on the basis of the DCT output shaft speed determined on the basis of a wrong signal from the wheel speed sensor immediately after IG-ON, so lower-gear pre-engagement may occur.

When a very low-shifting gear is pre-engaged while a vehicle is driven at a high speed, for example, when a low-shifting gear such as the first gear or the second gear is pre-engaged while a vehicle is driven at a high speed with the fifth gear engaged in comparison to the vehicle speed, the clutch of a non-driven input shaft associated with the gear to be pre-engaged is rotated at a high speed over about 9000 RPM, so that the clutch may break, which is called clutch burst.

For reference, IG-OFF and IG-ON mean turning off and on an engine in a vehicle provided with an engine, and in an electric vehicle or a hybrid vehicle without an engine, they mean operations corresponding to turning off and on an engine in a vehicle provided only with an engine by a driver.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method for a vehicle with a DCT, the control method being able to determine and use an appropriate DCT output shaft speed in a wheel speed-unknown state of a vehicle, and preventing clutch burst due to wrong pre-engagement by selecting an appropriate gear to be pre-engaged immediately after IG-OFF and IG-ON sequentially occur due to the intention of a driver while a vehicle is driven, improving the durability of a DCT.

In accordance with an aspect of the present invention, there is provided a control method for a vehicle with a DCT, the control method including: a wheel speed determination step that determines whether it is a wheel speed-unknown state by a TCU; an input shaft sensor determination step that determines whether an input shaft speed sensor IS for a driving input shaft is in a normal state when it is the wheel speed-unknown state, by the TCU; an OFF-determination step that determines whether IG-OFF occurs when it is the wheel speed-unknown state and the input shaft speed sensor IS for the driving input shaft is in a normal state, by the TCU; a data storage step that stores information related to the current wheel speed-unknown state and an output shaft speed of the DCT determined by the input shaft speed sensor IS for the driving input shaft when it is determined that there was IG-OFF as the result of the OFF-determination step, by the TCU; an ON-determination step that determines whether the TCU is not in TCU latch-off and whether it was the wheel speed-unknown state immediately before IG-OFF on the basis of the stored data, when IG-ON occurs after the data storage step; and an emergency pre-engagement step that performs pre-engaging by the TCU on the basis of the DCT output shaft speed stored in the data storage step immediately after IG-OFF, when the TCU is not in latch-off and it is determined that it was the wheel speed-unknown state immediately before IG-OFF as the result of the ON-determination step.

When it is not in the wheel speed-unknown state as the result of the wheel speed determination step, the TCU may control the DCT using the output shaft speed of the DCT determined using the signal from the wheel speed sensor.

When the input shaft speed sensor for the driving input shaft is in a normal state as the result of the input shaft sensor determination step, the TCU may control the DCT using the output shaft speed of the DCT determined using the signal from the input shaft speed sensor for the driving input shaft.

The control method may further include a re-determination step that compares the vehicle speed determined using the signal from the input shaft speed sensor for the driving input shaft and the vehicle speed determined using the wheel speed sensor, determining whether the difference is less than a reference vehicle speed, by the TCU, after the emergency pre-engagement step, in which when the difference is less than the reference vehicle speed as the result of the re-determination step, the TCU may start to control the DCT using the output shaft speed of the DCT determined using the wheel speed sensor.

When the difference is the reference vehicle speed or higher as the result of the re-determination step, the TCU may start to control the DCT using the output shaft speed of the DCT determined using the signal from the input shaft speed sensor for the driving input shaft.

According to the control method for a vehicle with a DCT, it is possible to determine and use an appropriate DCT output shaft speed in a wheel speed-unknown state of a vehicle, and preventing clutch burst due to wrong pre-engagement by selecting an appropriate gear to be pre-engaged immediately after IG-OFF and IG-ON sequentially occur due to the intention of a driver while a vehicle is driven, improving durability of a DCT.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
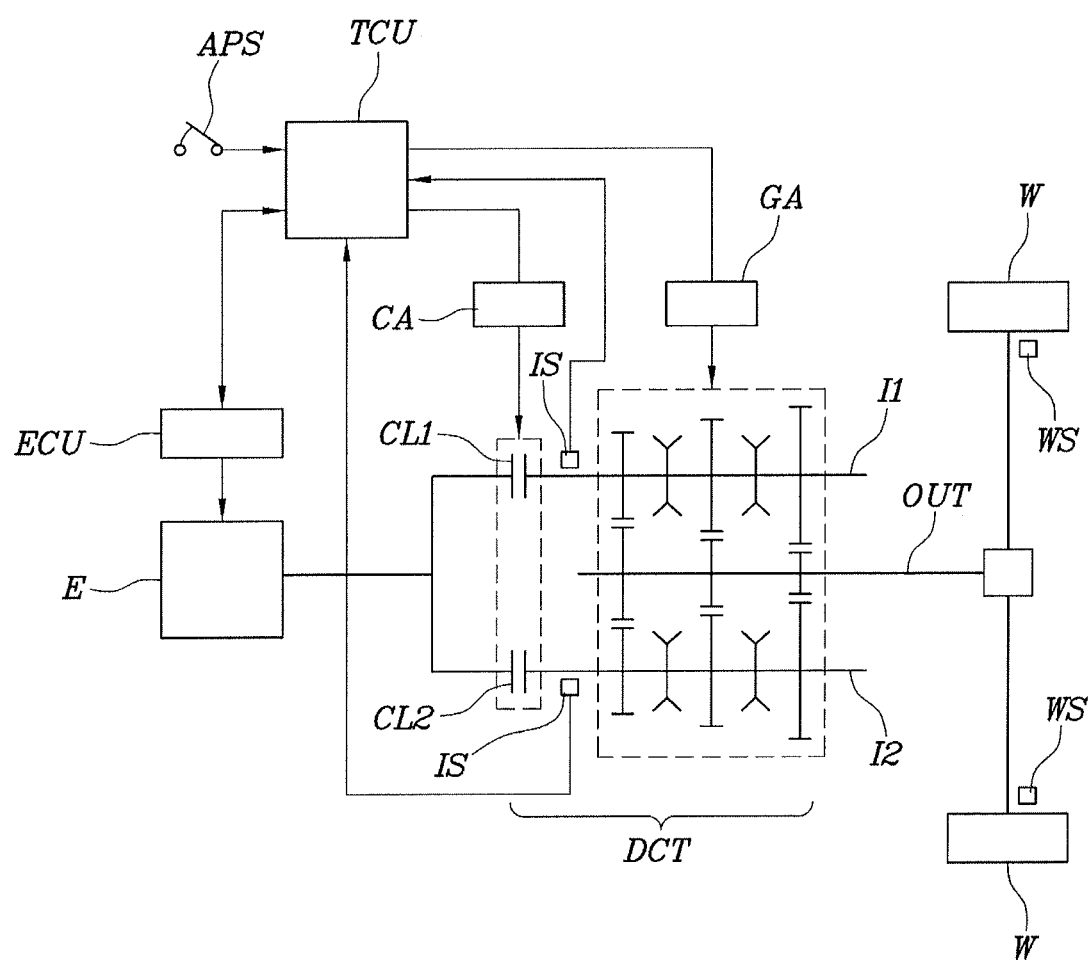
FIG. 1 is a view showing an example of the configuration of a vehicle with a DCT to which the present invention can be applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a view showing an example of the configuration of a vehicle with a DCT to which the present invention may be applied, in which power from an engine E is selectively provided to two input shafts I1 and I2 through two clutches CL1 and CL2 of the DCT and the power that has been adjusted through the DCT is provided to wheels W through one output shaft OUT.

A TCU which is a control controlling the DCT is connected to an Engine Control Device (ECU) to be configured to receive information such as engine torque and make requests such as torque reduction to the engine E and is connected to a clutch actuator CA controlling two clutches of the DCT and to a gear actuator GA shifting gear of the DCT to control the clutch actuator CA and the gear actuator GA.

The TCU is configured to receive a signal from an acceleration pedal sensor APS and to receive rotation speeds of the input shafts I1 and I2 of the DCT from two input shaft speed sensors IS.

Furthermore, there is provided a wheel speed sensor WS that detects the rotation speed of the wheels W and the TCU can receive a signal from the wheel speed sensor WS through a communication system such as CAN not shown in the figures.

One of the two input shafts is associated with the currently engaged gear, so that the input shafts may be divided into a driving input shaft used to transmit power to the wheels W and a non-driving input shaft for pre-engaging a gear which is expected to be engaged next without transmitting power to the wheels W.

Obviously, the clutch connected to the driving input shaft has been engaged and the clutch connected to the non-driving input shaft has not been engaged.

One of the two input shafts is usually used to engage odd-numbered gears, so it is also called an odd-numbered input shaft, and the other one is used to engage even-numbered gears and the R-gear which is the reverse gear, so it is also called an even-numbered input shaft. For example, in a transmission with six forward stages, the odd-numbered input shaft is configured to engage the first, third, and fifth gears and the even-numbered input shaft is configured to engage the second, fourth, sixth, and R gears.

Figure 2:
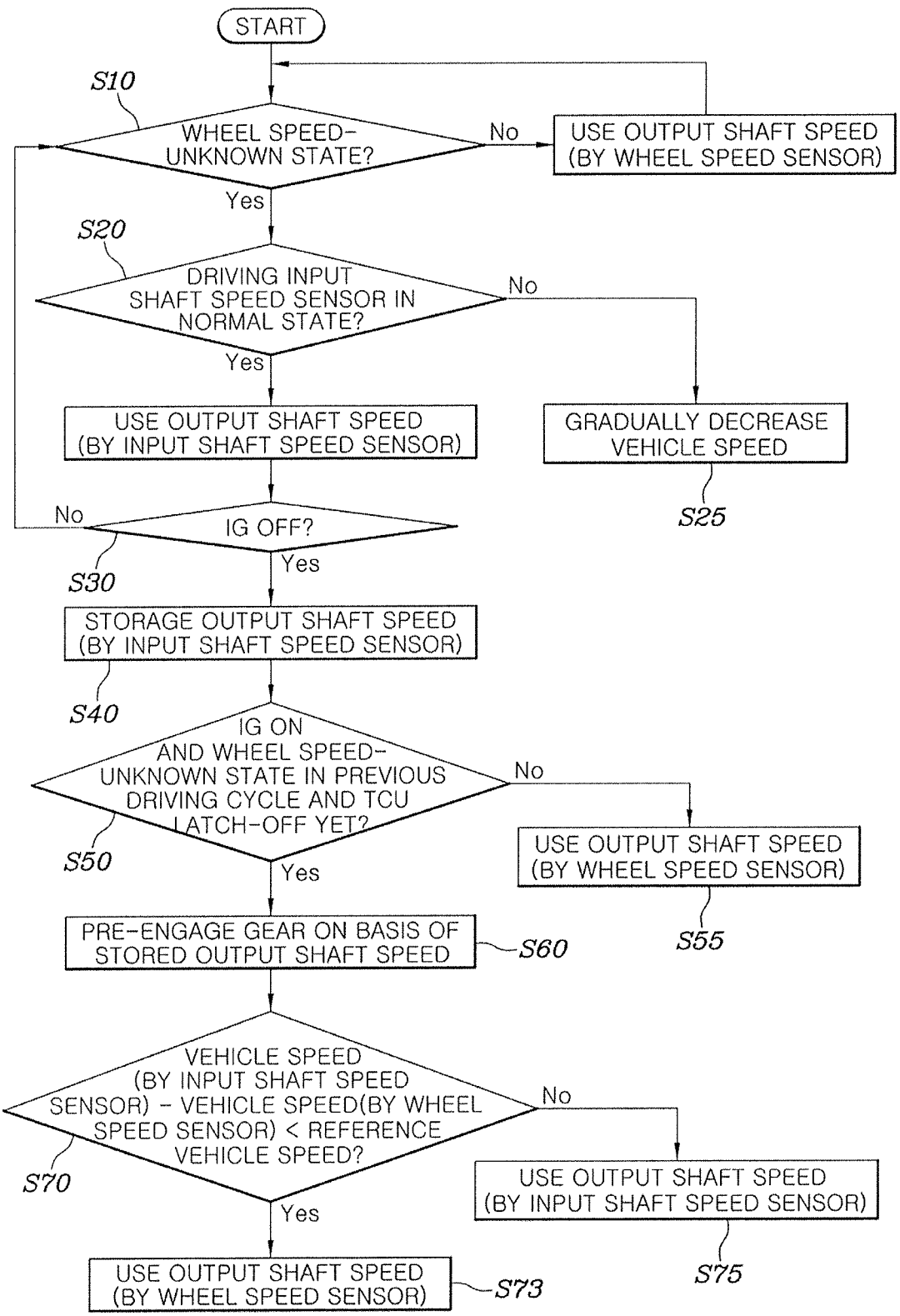
FIG. 2 is a flowchart illustrating an exemplary embodiment of a control method for a vehicle with a DCT according to an exemplary embodiment of the present invention.

Referring to FIG. 2, an exemplary embodiment of a control method for a vehicle with a DCT of the present invention includes: a wheel speed determination step (S10) that determines, by a TCU, whether it is a wheel speed-unknown state; an input shaft sensor determination step (S20) that determines, by the TCU whether an input shaft speed sensor IS for a driving input shaft is in a normal state when it is the wheel speed-unknown state; an OFF-determination step (S30) that determines, by the TCU whether IG-OFF occurs when it is the wheel speed-unknown state and the input shaft speed sensor IS for the driving input shaft is in a normal state; a data storage step (S40) that stores, by the TCU information related to the current wheel speed-unknown state and an output shaft speed of the DCT determined by the input shaft speed sensor IS for the driving input shaft when it is determined that there was IG-OFF as the result of the OFF-determination step (S30); an ON-determination step (S50) that determines whether the TCU is not in TCU latch-off and whether it was the wheel speed-unknown state immediately before IG-OFF on the basis of the stored data, when IG-ON occurs after the data storage step (S40); and an emergency pre-engagement step (S60) that performs pre-engaging by the TCU on the basis of the DCT output shaft speed stored in the data storage step (S40) immediately after IG-OFF, when the TCU is not in latch-off and it is determined that it was the wheel speed-unknown state immediately before IG-OFF as the result of the ON-determination step (S50).

In an exemplary embodiment of the present invention, when the TCU is in latch-off and it is determined that the vehicle was in the wheel speed-unknown state immediately before IG-OFF as the result of the ON-determination step S50, the TCU is configured to control the DCT using the output shaft speed of the DCT determined using the wheel speed sensor (S55).

That is, according to an exemplary embodiment of the present invention, when it is the wheel speed-unknown state in which the TCU cannot receive a normal signal from the wheel speed sensor WS due to failure of the wheel speed sensor WS or a communication system such as CAN, the output shaft speed of the DCT is first determined to control shifting by the DCT on the basis of a signal from the input shaft speed sensor IS for the driving input shaft. Furthermore, when a driver performs IG-ON after IG-OFF while the signal from the input shaft speed sensor IS is used, the OFF-determination step (S30), data storage step (S40), and ON-determination step (S50) are performed such that pre-engagement is performed on the basis not of the current wrong signal from the wheel speed sensor WS, but on the basis of the signal from the input shaft speed sensor IS for the driving input shaft immediately before IG-OFF through the emergency pre-engagement step (S60) immediately after IG-ON, to prevent bursting of a clutch connected to a non-driving input shaft due to pre-engagement of a too low-shifting gear while a vehicle is driven at a high speed, as in the related art.

For reference, the TCU latch-off means that the TCU stops all operations, stores necessary data in a non-volatile memory such as an Electrically Erasable Programmable Read-Only Memory (EEPROM), and shuts down. Verifying whether the TCU is not in TCU latch-off in the ON-determination step means that IG-On has occurred after IG-OFF due to the intention of a driver and output shaft speed stored before can still be effectively used as a basis for selecting a gear to be pre-engaged.

When it is not in the wheel speed-unknown state as the result of the wheel speed determination step (S10), the TCU controls the DCT using the output shaft speed of the DCT determined using the signal from the wheel speed sensor SW, performing pre-engaging or shifting.

When the input shaft speed sensor IS for the driving input shaft is in a normal state as the result of the input shaft sensor determination step (S20), the TCU controls the DCT using the output shaft speed of the DCT determined using the signal from the input shaft speed sensor IS for the driving input shaft.

When the input shaft speed sensor IS for the driving input shaft is not in a normal state as the result of the input shaft sensor determination step (S20), the TCU controls to the vehicle speed to be decreased.

That is, since it is the wheel speed-unknown state as the result of the wheel speed determination step (S10), the output shaft speed of the DCT is determined and used to control the DCT in consideration of the signal from the input shaft speed sensor IS for the driving input shaft and the gear ratio of the engaged gear, as a temporary and urgent measure.

Meanwhile, as shown in FIG. 2, when it is determined that the input shaft speed sensor for the driving input shaft is also not in a normal state, the TCU gradually reduces the vehicle speed.

The method of the present invention further includes a re-determination step (S70) that compares the vehicle speed determined using the signal from the input shaft speed sensor IS for the driving input shaft and the vehicle speed determined using the wheel speed sensor WS, determining whether the difference is less than a reference vehicle speed, by the TCU, after the emergency pre-engagement step (S60). When the difference is less than the reference vehicle speed as the result of the re-determination step (S70), the TCU starts to control the DCT using the output shaft speed of the DCT determined using the wheel speed sensor WS (S73).

In an exemplary embodiment of the present invention, when the difference is the reference vehicle speed or higher as the result of the re-determination step S70, the TCU starts to control the DCT using the output shaft speed of the DCT determined using the signal from the input shaft speed sensor for the driving input shaft (S75).

In the re-determination step (S70), if the wheel speed-unknown state is removed by any reason after IG-OFF and IG-ON and there is not a substantially large difference between the vehicle speed determined using the input shaft speed sensor IS for the driving input shaft and the vehicle speed determined using the wheel speed sensor WS, the TCU, as initially designed, controls the DCT using the output shaft speed of the DCT determined using the signal from the wheel speed sensor WS.

Accordingly, the reference vehicle speed may be set as about an allowable difference between the vehicle speed determined using wheel speed sensor WS and the vehicle speed determined using the input shaft speed sensor IS for the driving input shaft, so, for example, it may be set as about 5 KPH etc.

Obviously, when the difference is the reference vehicle speed or higher as the result of the re-determination step (S70), the TCU determines that it is still in the wheel speed-unknown state, and then starts to control the DCT using the output shaft speed of the DCT determined using the signal from the input shaft speed sensor IS for the driving input shaft.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a vehicle with a Dual Clutch Transmission (DCT), the control method comprising:
   a wheel speed determination step of determining, by a transmission control unit (TCU), when the vehicle is in a wheel speed-unknown state;
   an input shaft sensor determination step of determining, by the TCU when an input shaft speed sensor for a driving input shaft is in a normal state while the vehicle is in the wheel speed-unknown state;
   an OFF-determination step of determining, by the TCU when IG-OFF occurs while the vehicle is in the wheel speed-unknown state and the input shaft speed sensor for the driving input shaft is in the normal state;
   a data storage step of storing information related to a current wheel speed-unknown state and an output shaft speed of the DCT determined by the input shaft speed sensor for the driving input shaft when it is determined, by the TCU that there was the IG-OFF as a result of the OFF-determination step;
   an ON-determination step of determining when the TCU is not in TCU latch-off, and when the vehicle was in the wheel speed-unknown state before the IG-OFF on a basis of the stored information, while IG-ON occurs after the data storage step; and an emergency pre-engagement step of performing pre-engaging by the TCU on a basis of the DCT output shaft speed stored in the data storage step after the IG-OFF, while the TCU is not in latch-off and it is determined that the vehicle was in the wheel speed-unknown state before the IG-OFF as a result of the ON-determination step.

2. The control method of claim 1, wherein, when the vehicle is not in the wheel speed-unknown state as a result of the wheel speed determination step, the TCU is configured to control the DCT using the output shaft speed of the DCT determined using a signal of the wheel speed sensor.

3. The control method of claim 2, wherein, when the input shaft speed sensor for the driving input shaft is in the normal state as a result of the input shaft sensor determination step, the TCU is configured to control the DCT using the output shaft speed of the DCT determined using a signal from the input shaft speed sensor for the driving input shaft.

4. The control method of claim 3, wherein, when the input shaft speed sensor for the driving input shaft is not in the normal state as the result of the input shaft sensor determination step, the TCU is configured to decrease the vehicle speed.

5. The control method of claim 1, further including:
a re-determination step of comparing the vehicle speed determined using a signal from the input shaft speed sensor for the driving input shaft and the vehicle speed determined using the wheel speed sensor, and of determining, by the TCU when a difference between the vehicle speed determined using a signal from the input shaft speed sensor for the driving input shaft and the vehicle speed determined using the wheel speed sensor is less than a reference vehicle speed, after the emergency pre-engagement step,
wherein, when the difference is less than the reference vehicle speed as a result of the re-determination step, the TCU starts to control the DCT using the output shaft speed of the DCT determined using the wheel speed sensor.

6. The control method of claim 5, wherein, When the difference is the reference vehicle speed or higher as the result of the re-determination step, the TCU starts to control the DCT using the output shaft speed of the DCT determined using the signal from the input shaft speed sensor for the driving input shaft.

7. The control method of claim 1, wherein, when the TCU is in the latch-off and it is determined that the vehicle was the wheel speed-unknown state before the IG-OFF as the result of the ON-determination step, the TCU is configured to control the DCT using the output shaft speed of the DCT determined using the wheel speed sensor.

* * * * *